(12) United States Patent
Lin et al.

(10) Patent No.: US 6,825,263 B2
(45) Date of Patent: Nov. 30, 2004

(54) CURABLE COATING COMPOSITIONS FROM EMULSIONS OF ELASTOMERIC POLYMERS AND POLYURETHANE DISPERSIONS

(75) Inventors: Shaow Burn Lin, Midland, MI (US); Anne Katja Shim, Midland, MI (US); David Shawn Tascarella, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 10/321,234

(22) Filed: Dec. 17, 2002

(65) Prior Publication Data

US 2003/0191233 A1 Oct. 9, 2003

Related U.S. Application Data

(63) Continuation-in-part of application No. 10/118,746, filed on Apr. 8, 2002, now abandoned.

(51) Int. Cl.$^7$ .............................................. C08L 75/04
(52) U.S. Cl. ...................................................... 524/507
(58) Field of Search ................................ 524/507, 501, 524/506

(56) References Cited

U.S. PATENT DOCUMENTS

| | | | |
|---|---|---|---|
| 4,281,040 A | 7/1981 | Santiago | 428/195 |
| 4,981,730 A | 1/1991 | Zaleski | 427/393.5 |
| 5,013,811 A | 5/1991 | Ross | 528/60 |
| 5,073,418 A | 12/1991 | Thornton et al. | 428/34.9 |
| 5,110,666 A | 5/1992 | Menzel et al. | 428/196 |
| 5,254,621 A | 10/1993 | Inoue et al. | 524/837 |
| 5,258,443 A * | 11/1993 | Nield et al. | 524/501 |
| 5,486,210 A | 1/1996 | Kerr et al. | 8/115.66 |
| 5,554,686 A | 9/1996 | Frisch, Jr. et al. | 524/588 |
| 5,654,360 A * | 8/1997 | Palasz | 524/521 |
| 5,747,582 A | 5/1998 | Schutze et al. | 524/591 |
| 5,886,082 A * | 3/1999 | Numa et al. | 524/501 |
| 5,985,369 A | 11/1999 | Kerkmann et al. | 427/380 |
| 5,998,540 A | 12/1999 | Lipkin et al. | 524/591 |
| 6,037,279 A | 3/2000 | Brookman et al. | 442/71 |
| 6,077,611 A * | 6/2000 | Griswold et al. | 428/423.3 |
| 6,169,043 B1 * | 1/2001 | Li | 442/71 |
| 6,177,365 B1 | 1/2001 | Li | 442/71 |
| 6,177,366 B1 | 1/2001 | Li | 442/71 |
| 6,239,046 B1 | 5/2001 | Veiga et al. | 442/76 |
| 6,425,600 B1 | 7/2002 | Fujiki et al. | 280/728.1 |
| 6,520,186 B2 * | 2/2003 | Rollat et al. | 132/203 |

FOREIGN PATENT DOCUMENTS

| | | | |
|---|---|---|---|
| EP | 0702071 | 3/1996 | |
| EP | 1035165 | 9/2000 | |
| GB | 835855 | 5/1960 | |
| WO | WO 00/78577 A1 | 12/2000 | B60R/21/16 |
| WO | WO 00/78578 A1 | 12/2000 | B60R/21/16 |

OTHER PUBLICATIONS

10273587 Japanese Abstract, 19981013.
Abstract JP 62081467 Apr. 14, 1987.

* cited by examiner

*Primary Examiner*—Margaret G. Moore
(74) *Attorney, Agent, or Firm*—Alan Zombeck

(57) ABSTRACT

A curable coating composition comprises:
(A) a water continuous emulsion comprising a curable elastomeric polymer having a viscosity of 0.5–1,000,000 KPa-s and a glass transition temperature up to 50° C.;
(B) an aqueous polyurethane dispersion; and optionally,
(C) a cure agent.

Methods for preparing the curable coating compositions are also disclosed. The curable coating composition and the cured coatings derived from the reaction product of this composition are useful as fabric coatings, and in particular for decreasing air permeability of the coated fabrics at relatively lower coating weights.

33 Claims, 1 Drawing Sheet

US 6,825,263 B2

CURABLE COATING COMPOSITIONS FROM EMULSIONS OF ELASTOMERIC POLYMERS AND POLYURETHANE DISPERSIONS

CROSS-REFERENCE TO RELATED APPLICATIONS

This patent application is a continuation-in-part of U.S. patent application Ser. No. 10/118,746, filed Apr. 4, 2002, abandoned.

FIELD OF THE INVENTION

The present invention relates to a coating composition comprising a water continuous emulsion of a curable elastomeric polymer, an aqueous polyurethane dispersion, and an optional cure agent. Methods for making the coating composition are also taught. The present invention further relates to a cured coating product formed from the composition.

BACKGROUND OF THE INVENTION

The use of airbags in motor vehicles has grown exponentially in recent years. Their use has expanded beyond frontal airbags for protection for the driver and passenger. Side airbags and inflatable curtains are now included in side compartments of vehicles for enhanced protection from side collisions or rollovers. This expanded use has placed new demands on the physical properties attributed to the airbags. In particular, improved air retention performance of airbags are desired to ensure the airbag remains inflated and maintains its integrity for an extended period of time upon deployment.

Typically, airbags are made from synthetic fibers, such as a polyamide (nylon) or polyester and coated with a polymeric film. The most common polymeric materials currently being used to coat airbag fabrics are based on silicones, as described for example in U.S. Pat. No. 6,037,279. The silicone coating primarily provides a thermal barrier on the airbags to protect the fabric from the high temperature burst associated with ignition of the gas upon deployment. The silicone coating also provides some gas retention properties for the deployed airbag. One option to meet the increasing demand for gas retention is to increase the thickness of the silicone coating. However, newer designs for airbags, and in particular side impact airbags and inflatable curtains for side compartments, require airbags to have a more compact design. This results in a need for lower coating weights on the airbag fabrics. Furthermore, next generation side and inflatable curtain airbags have a need to retain pressured air/gas for sufficient time to provide rollover protection for greater than 5 seconds. Current silicone based coatings are too permeable to air/gas, especially at lower coat weights, to provide sufficient gas retention in deployed side and curtain airbags. Thus, there is a need for a fabric coating composition, and methods of application, to provide coated fabrics with sufficient air/gas retention for use in the construction of airbags, and in particular side and curtain airbags.

The current airbag fabrics also requires the removal of unwanted sizing, protective oil after woven steps before application of the coating material. This is done by chemical scouring, washing, then drying of the scoured airbag fabrics. These steps are non-value added, labor-intensive, and costly. Also, residual moiture on the fabric surface can cause imperfections on the coated surface when a non-aqueous coating is applied. Thus, there exsits an additional need to develop a coating composition that can be applied directly over wet fabrics, provides good adhesion to the fabric, and dries to a uniform coating without imprefections.

One technique that has been reported to decrease coating weights and maintain low permeability performance of coated fabrics for use in airbags has been to use a two layered coating system, as disclosed for example in U.S. Pat. No. 6,177,365. The U.S. Pat. No. 6,177,365 teaches the application of a first layer to the fabric of a non-silicone material followed by the application of a silicone containing topcoat. U.S. Pat. No. 6,177,366 also teaches a two layer coating system for airbag fabrics where the first layer contains up to 30% of a silicone resin and the topcoat contains a silicone material. U.S. Pat. No. 6,239,046 teaches an airbags having a first coating layer of adhesive polyurethane and a second coating layer of an elastomeric polysiloxane.

Alternative coating compositions have been disclosed based on polyurethanes, such as in U.S. Pat. No. 5,110,666, or on polyurethane/polyacrylate dispersions as found in U.S. Pat. No. 6,169,043.

While the coating systems cited above represents advancements in airbag technology, a need still exists to provide improved compositions and techniques for coating fabrics for use in airbags. In particular, coating compositions that provide similar or improved permeability at lower coating weights and improved aging stability are desired. Furthermore, there is a need to provide coatings that eliminate the need for pre-treatment of the fabrics.

SUMMARY OF THE INVENTION

The present invention is directed to a curable coating composition comprising:

(A) a water continuous emulsion comprising a curable elastomeric polymer having a viscosity of 0.5–1,000,000 KPa-s and a glass transition temperature up to 50° C.;

(B) an aqueous polyurethane dispersion; and optionally, (C) a cure agent.

Methods for making the curable coating compositions are also provided herein. The present invention is further directed to a cured coating composition comprising a reaction product of the above-described composition.

DETAILED DESCRIPTION OF THE INVENTION

Figure 1:
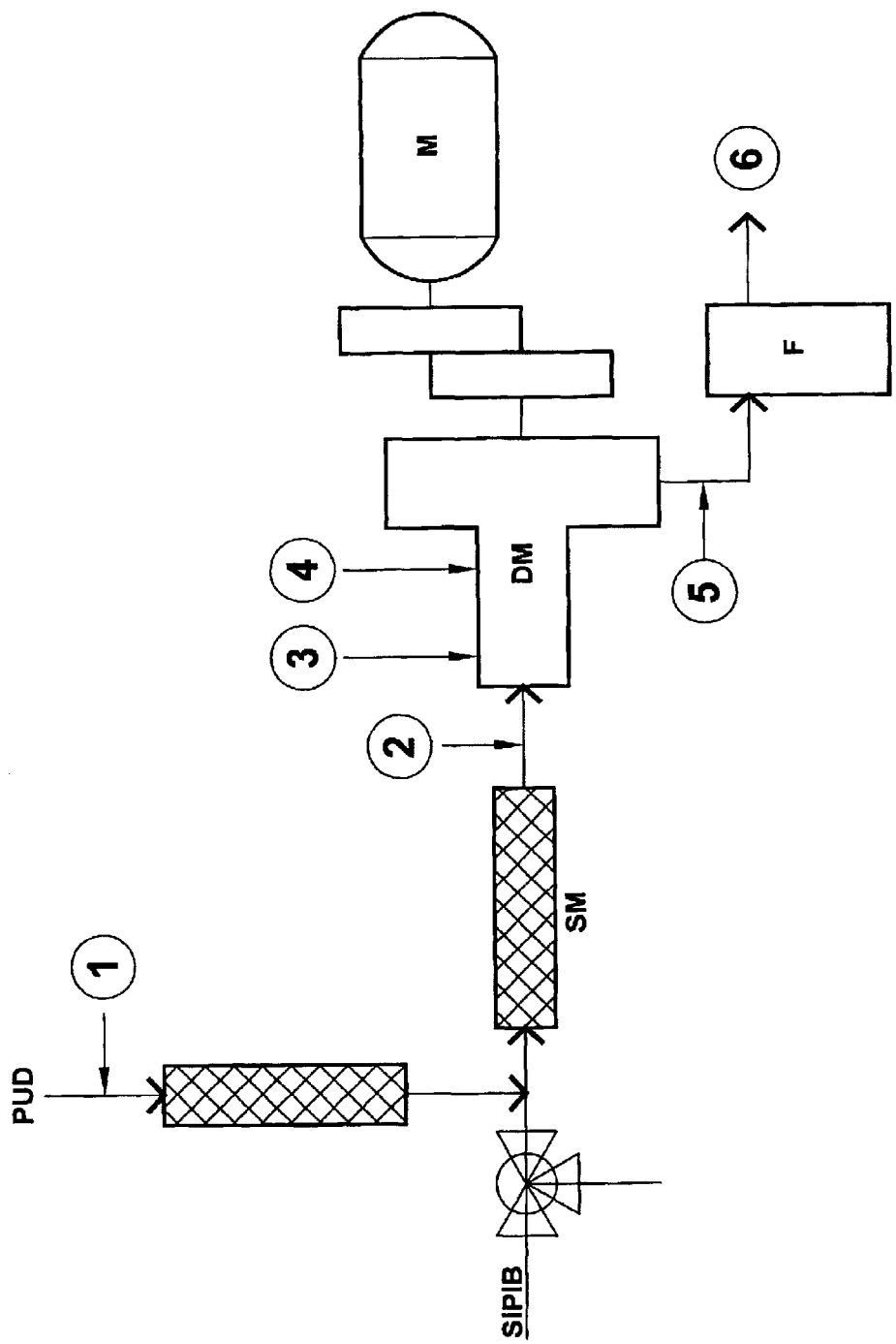
FIG. 1 is a simplified schematic flow diagram of a representative continuous process for producing the curable coating compositions of the present invention.

A curable coating composition according to the present invention comprises:

(A) a water continuous emulsion comprising a curable elastomeric polymer having a viscosity of 0.5–1,000, 000 KPa-s and a glass transition temperature up to 50° C.;

(B) an aqueous polyurethane dispersion; and optionally, (C) a cure agent.

Component (A) is a water continuous emulsion comprising a curable elastomeric polymer having a viscosity of 0.5–1,000,000 KPa-s and a glass transition temperature up to 50° C. As used herein, "water-continuous emulsion" refers to an emulsion having water as the continuous phase of the emulsion. Water-continuous emulsions are characterized by their miscibility with water and/or their ability to be diluted by the further addition of water.

The elastomeric polymers that can be used as starting materials to prepare the water continuous emulsion suitable as component (A) in the present invention, are any polymers having a viscosity of 0.5–1,000,000 KPa-s and a glass transition temperature up to 50° C. One skilled in the art recognizes the term elastomeric to describe materials as having rubber-like properties or rubbery characteristics, that is, materials which can be extended to twice its own length at room temperature or having an elongation of 100% or higher at room temperature. When the term "polymer" is used herein, it should be understood to describe polymers that may be homopolymers, copolymers, terpolymers, and mixtures thereof.

For the purpose of this invention, the viscosity of the curable elastomeric polymer is defined as "zero-shear" viscosity at ambient temperature. This is commonly defined as the viscosity of a polymer when approaching zero shear rate conditions and is regarded as a constant value for a given polymer. The "zero-shear" viscosity is an approximated constant viscosity value derived empirically or from experimentally measured viscosity values.

The curable elastomeric polymers suitable in the present invention can have a viscosity of 0.5 to 1,000,000 KPa-s, preferably the viscosity is 0.5 to 500,000 KPa-s, and most preferable is when the curable elastomeric polymer has a viscosity of 1.0 to 100,000 KPa-s. While the correlation of viscosity and molecular weight will vary depending on the specific type of polymer, generally the number average molecular weights (Mn) of the curable elastomeric polymers that can be typically used in the present invention range from 5,000 to 300,000 g/mole, preferably 5,000 to 200,000 g/mole, and most preferably range from 5,000 to 100,000 g/mole.

For purposes of this invention, the term "glass transition temperature" is the accepted meaning in the art, that is, the temperature at which a polymer changes from a brittle vitreous state to a plastic state. The glass transition temperature can be determined by conventional methods such as dynamic mechanical analyzer (DMA) and differential scanning calorimetry (DSC). The curable elastomeric polymers of the present invention should have a glass transition temperature of less than 50° C. Preferably, the curable elastomeric polymers of the present invention should have a glass transition temperature of less than 30° C., and more preferably, the curable elastomeric polymers should have a glass transition temperature of less than 0° C.

As used herein, "curable elastomeric polymer" refers to any elastomeric polymer that has been modified to have at least one curable functional group attached to the polymer. Generally, curable elastomeric polymers are polymers having reactive groups contained therein that are able to crosslink during the curing process to yield an elastomeric polymer. The curable elastomeric polymers can be characterized as elastomeric polymers to which at least one reactive group or functional group is attached such as an alkenyl, vinyl, allyl, hydroxyl, carboxyl, epoxy, vinyl ether, alkoxy, amine, amino, amido, silane, organosilane, or organosilyl group. The reactive-group or functional group may be attached at a terminal and/or pendant position on the polymer chain. The curable elastomeric polymer should maintain structural integrity during the emulsification process and subsequently in the emulsion state. Upon water-removal, for example as in a coating application, the reactive-group or functional group cures to form a cured elastomeric polymer.

The curing may take place by merely drying off the water, or assisted by an external catalyst, heat, radiation, moisture, or in conjunction with an external curative.

The elastomeric polymers that can be used as starting materials to prepare the curable elastomeric polymers and subsequently emulsified to form water continuous emulsions suitable as component (A) of the present invention include, but are not limited to, the elastomeric polymers typically associated with the following general classes of elastomeric materials such as; natural rubber, polyolefins, poly(olefin-diene)s, polydienes, butyl rubber, nitrile rubber, chloroprene rubber, fluorocarbon elastomers, polysulfide rubbers, polyurethane and combinations thereof.

Illustrative examples of elastomeric polymers that can be functionalized to produce curable elastomeric polymers useful in the preparation of water continuous emulsions for the present invention include, but are not limited to: poly (olefins) and poly(olefins-dienes) copolymers, and their derivatives, that is, polymers and copolymers derived from olefinic monomers $C_2$ to $C_{12}$, dienes $C_4$ to $C_{12}$ such as, polyethylene, polypropylene, poly(butene-1), poly (propylethylene), poly(decylethylene), poly (dodecylethylene), poly(butylethylene), poly (ethylethylene), poly(ethyl-2-propylene), poly (isopropylethylene), poly(isobutylethylene), poly (isopentylethylene), poly(heptylethylene), poly(tert-butylethylene), poly(ethyele-co-propylene), poly(ethylene-propylene-diene) terpolymers (EPDM); polymers and copolymers of monoolefin, isomonoolefin and vinyl aromatic monomers, such as $C_2$ to $C_{12}$ monoolefins, $C_4$ to $C_{12}$ isomonoolefins, vinyl aromatic monomers including styrene, para-alkylstyrene, para-methylstyrene, (methods of preparing such polymers can be found in U.S. Pat. No. 5,162,445, and U.S. Pat. No. 5,543,484); poly(dienes) and derivatives; such as, polybutadiene, polyisoprene, poly (alkyl-butenylene) where alkyl can be a hydrocarbon group containing 1 to 12 carbon atoms, poly(phenyl-butenylene), polypentenylene, natural rubber (a form of polyisoprene), butyl rubber (copolymer of isobutylene and isoprene), illustrative commercial examples of polyisobutylenes suitable in the present invention are OPPANOL B products from BASF (BASF, Ludwigshafen, Germany), VISTANEX™ products from Exxon (Houston, Tex.), and EPION products from Kaneka (Kanegafuchi Chemical Industry Co. Ltd. Tokyo, Japan and Kaneka America Corp, New York, N.Y.); halogenated olefin polymers; such as from the bromination of copolymers of isomonoolefin with para-methylstyrene to introduce benzylic halogen (as described in U.S. Pat. No. 5,162,445), halogenated polybutadienes, halogenated polyisobutylene such as EXXPRO™ products from Exxon-Mobil (Houston, Tex.), poly(2-chloro-1,3-butadiene), polychloroprene (85% trans), poly(1-chloro-1-butenylene) (NEOPRENE™), chlorosulfonated polyethylene; polyurethanes and polyureas; such as elastomeric polyurethanes and polyureas prepared from a wide variety of monomeric diisocyanates (aliphatic diisocyanates such as hexamethylene diisocyanate, cyclohexyldiisocyanate, ($H_{12}$MDI) or hydrogenated MDI (HMDI), isophorone diisocyanate (IPDI)); aromatic diisocyanates such as toluene diisocyanate (TDI), bis(methylene-p-phenyl diisocyanate (MDI), chain-extending diols, diamines, and oligomeric diols selected from polyether, polyester, polycarbonate, and polycaprolatom; poly(alkyl acrylates), and poly (alkyl methacryaltes), that is polymers and copolymers derived from alkyl acrylates and alkyl methacrylates such as poly(methyl acrylate), poly(ethyl acrylate), poly(butyl acrylate), poly(isobutyl acrylate), poly(2-ethylbutyl acrylate), poly(2-ethylhexyl acrylate), poly(n-octyl methacrylate), poly(dodecyl acrylate); copolymers and terpolymers of dienes, alkenes, styrenes, acrylonitriles, such as poly(butadiene-co-styrene), poly(butadiene-co-acrylonitrile), poly(butadiene-co-methyl metharyalte); poly(fluoroalkyl acrylates) that is polymers and copolymers derived from fluoro-containing acrylates and methacrylates such as polymer(fluoromethyl acrylate), poly(2,2,2-trifuoroethyl acryalte), poly(1H,1H-pentfluoropropyl acryate), poly(1H,1H,5H-octafluoropentyl acrylate); poly(vinyl ethers) and poly(vinyl thioethers) such as those polymers derived from butoxyethylene, sec-butoxyethylene, tert-butoxyethylene, alkyl vinyl ether, propoxyethylene, vinyl methyl ether (methoxyethylene), hexyloxyethylene, 2-ethylhexyloxy ethylene, butylthioethylene; poly(oxyalkylenes) such as poly(oxyethylene), poly(oxypropylene), poly(oxythylene-co-propylene); plasticizer compounded thermoplastics, that is thermoplastics having elastomeric behavior because of the addition of a plasticizers or other compatible additives, such as poly(vinyl chloride) compounded with dioctyl phthalate, tricresyl phophate, dibutyl sebacate, or poly(propylene adipate); fluoro elastomers and chloro-containing polymers derived from poly(alkylenes), poly(dienes) such as, poly(dichloroethyelene), poly(chlorofluoroethylene).

Thus, the curable elastomeric polymer can be an alkenyl-functional elastomeric polymer where the alkenyl group is selected from a hydrocarbon group containing 2 to 12 carbons such as vinyl, allyl, propenyl, butenyl, hexenyl, etc. The elastomeric polymers bearing such alkenyl functional groups may be derived from most of the elastomeric polymers, as described above, including poly(olefins) and poly(olefins-dienes) copolymers, and their derivatives: polymers and copolymers derived from olefinic monomers $C_2$ to $C_{12}$, dienes $C_4$ to $C_{12}$; polymers and copolymers of monoolefin, isomonoolefin and vinyl aromatic monomers: monoolefin $C_2$ to $C_{12}$, isomonoolefin $C_4$ to $C_{12}$, vinyl aromatic monomers including styrene, para-alkylstyrene, para-methylstyrene; examples include polymers derived from ethylene, propylene, isobutylene, isoprene, para-methylstyrene.

The curable elastomeric polymers can also be poly(dienes) and derivatives. Most of polymers, copolymers derived from dienes usually contain unsaturated ethylenic units on backbone or side-chains that are curable. Representative examples include polybutadiene, polyisoprene, polybutenylene, poly(alkyl-butenylene) where alkyl being $C_1$ to $C_{12}$, poly(phenyl-butenylene), polypentenylene, natural rubber (a form of polyisoprene); butyl rubber (copolymer of isobutylene and isoprene).

The curable elastomeric polymers can also be a halogenated olefin polymer. Representative examples of a halogenated olefin polymer include those polymers resulting from the bromination of a copolymer of isomonoolefin with para-methylstyrene to introduce benzylic halogen (as described in U.S. Pat. No. 5,162,445), halogenated polybutadienes, halogenated polyisobutylene, poly(2-chloro-1,3-butadiene), polychloroprene (85% trans), poly(1-chloro-1-butenylene) (NEOPRENE™), chlorosulfonated polyethylene. The brominated poly(isobutylene-co-para-methylstyrene) can be further cured via zinc oxide upon influence of heat.

The curable elastomeric polymers can also be polymers containing vinyl ether-, acrylate-, methyacrylate-, and epoxy-functional groups. Also, the elastomeric polymers can be hydroxyl terminal or hydroxy containing poly(oxyalkylenes) polymers, such as poly(oxyethylene), poly(oxypropylene), or poly(oxythylene-co-propylene) polymers.

The curable elastomeric polymer can be selected from reactive silane group-containing elastomeric polymers, mixtures of reactive silane group-containing elastomeric polymers, blends of reactive silane group-containing elastomeric polymers with conventional elastomeric polymers, mixtures or blends of conventional elastomeric polymers with reactive silane group containing silicone polymers. The reactive silane groups may be attached at the terminal and/or pendant positions on the polymer chain and the total number of these reactive silicone groups may be varied to provide a cured elastomeric structure with desirable properties. Representative silane-modified elastomeric polymers are silyated polymers and copolymers derived from olefins, such as the isobutylene polymers disclosed in U.S. Pat. No. 4,904,732, which is hereby incorporated by reference, isomonoolefin, dienes, ethylene or propylene oxides, vinyl aromatic monomers from $C_2$ to $C_{12}$ such as the silane-grafted copolymers of isomonoolefin and vinyl aromatic monomer as discussed in U.S. Pat. Nos. 6,177,519 B1 and 5,426,167. Commercial products illustrative of silylated propylene oxide polymers are the MS Polymers from Kaneka (Kanegafuchi Chemical Industry Co. Ltd. Tokyo, Japan and Kaneka America Corp, New York, N.Y.). Other representative silicon-modified elastomeric polymers are illustrated by, but not limited to; alkenylsilyl-functional elastomeric polymers such as vinylsilyl-, allylsilyl-, hexenylsilyl-containing elastomeric polymers that are curable to form and further the elastomeric polymer structure; and alkoxysilyl-functional elastomeric polymers such as polymers containing at least one alkoxylsilyl groups and/or their hydrolyzates selected from methoxysilyl, dimethoxysilyl, trimethoxysilyl, ethoxysilyl, diethoxysilyl, triethoxysilyl, and methoxyethoxylsilyl.

In one embodiment of the present invention, the curable elastomeric polymer is selected from the silylated copolymers of an isomonoolefin and a vinyl aromatic monomer as described in U.S. Pat. No. 6,177,519 B1, which is hereby incorporated by reference. The silylated copolymers may be characterized as the addition product of an olefin copolymer radical created by contact of the copolymer with a free radical generating agent and an olefinically unsaturated, hydrolyzable silane wherein the silane adds to the polymer backbone to produce a silane grafted or silane modified copolymer product.

Illustrative examples of olefin copolymers suitable for modification with silanes to produce the silylated copolymers of this embodiment of the present invention comprise copolymers containing at least 50 mole % of at least one $C_4$ to $C_7$ isomonoolefin and from 0.1 up to 50 mole % of at least one vinyl aromatic monomer. Typically, the vinyl aromatic monomers are mono-vinyl aromatics such as styrene, alpha-methylstyrene, alkyl-substituted styrenes such as t-butylstyrene and para-alkyl substituted styrenes wherein the alkyl group contains from 1 to 4 carbon atoms, more preferably para-methylstyrene. Suitable isomonoolefin monomers include isobutylene and the like. Typically, 100% of the isomonoolefinic content of the copolymer comprises isobutylene. Typically, olefin copolymers include elastomeric copolymers comprising isobutylene and para-methylstyrene and containing from about 0.1 to 20 mole % of para-methylstyrene. These copolymers have a substantially homogeneous compositional distribution such that at least 95% by weight of the polymer has a para-methylstyrene content within 10% of the average para-methylstyrene content of the polymer. They are also characterized by a narrow molecular weight distribution Mw/Mn (where Mw is weight average molecular weight, and Mn is number average molecular weight) of less than about 5, alternatively less than about 3.5, a glass transition temperature (Tg) of below about −50° C. and a number average molecular weight (Mn) in the range of about 2,000 to 1,000,000, and alternatively from 10,000 to 50,000.

Suitable unsaturated organic silanes which can be reacted with the olefin copolymer backbone to produce the silylated copolymers of this embodiment are of the general formula RR'SiY$_2$ wherein R represents a monovalent olefinically unsaturated hydrocarbon or hydrocarbonoxy radical reactive with the free radical sites produced on the backbone polymer, Y represents a hydrolyzable organic radical and R' represents an alkyl or aryl radical or a Y radical. Where R is a hydrocarbonoxy radical, it should be non-hydrolyzable. In the preferred embodiment R may be a vinyl, allyl, butenyl, 4-pentenyl, 5-hexenyl, cyclohexenyl or cyclopentadienyl radical, with vinyl being the preferred radical. The group Y may be one or a mixture of $C_1$ to $C_4$ alkoxy radical such as methoxy, ethoxy, propoxy, or butoxy; Y may also be selected from acyloxy radicals such as formyloxy, acetoxy or propionoxy; oximo radicals such as —ON=C(CH$_3$)$_2$, —ON=C(CH$_3$)(C$_2$H$_5$) and —ON=C(C$_6$H$_5$)$_2$; or substituted amino radicals such as alkylamino or arylamino radicals, including —NHCH$_3$,—NHC$_2$H$_5$ and —NHC$_6$H$_5$ radicals. The group R' represents either an alkyl group, an aryl group or a Y group. The group R' can be exemplified by a methyl, ethyl, propyl, butyl, phenyl, alkylphenyl group or a Y group. Alternatively, R' is a methyl or alkoxy group. Typically, the silanes are those where R' and Y are selected from methyl and alkoxy groups, e.g., vinyltriethoxysilane, vinyltrimethoxysilane and methyl vinyl dimethoxysilane.

Typically, the free radical initiator used to create the silylated copolymers for this embodiment of the present invention is an organic peroxide compound having a half-life, at the reaction temperature, of less than one tenth of the reaction/residence time employed.

The water continuous emulsions comprising a curable elastomeric polymer can be selected from the emulsions described in U.S. application Ser. No. 09/905,660, which is hereby incorporated by reference. U.S. application Ser. No. 09/905,660 describes water-continuous emulsion composition comprising;

(A) 100 parts of a curable elastomeric polymer having a viscosity of 0.5–1,000,000 KPa-s and a glass transition temperature up to 50° C., (B) 3 to 30 parts surfactant (C) 0.5 to 50 parts of an internal cure additive (D) 5 to 45 parts water wherein the water-continuous emulsion has a solids content of greater than 75 weight %, an average particle size less than 5 μm, having sufficient stability to produce a stable lower solids emulsion upon dilution with water.

Component (B) of the compositions of the present invention is a polyurethane dispersion. "Polyurethane dispersion" as used herein describes stable mixtures of polyurethane polymers in water. Methods of preparing polyurethane dispersions are well known in the art and many of polyurethane dispersions are commercially available. Polyurethane polymers are generally characterized by their monomer content and most commonly involve the reaction of a diisocyanate with a polyol and chain extender. While the present inventors believe the polyurethane dispersion can be a stable aqueous mixture of any known polyurethane, typically the polyurethanes suitable for the use in the aqueous polyurethane dispersions are the reaction products (a) an isocyanate compound having at least two isocyanate (—NCO) functionalities per molecule; (b) a polyol having at least two hydroxy functionalities per molecule and a molecular weight ranging from 250 to 10,000 g/mole. The polyol may be selected from those commonly found in polyurethane manufacturing such as hydroxy-containing or terminated polyethers, polyesters, polycarbonates, polycaprolactones, polythioethers, polyetheresters, polyolefins, and polydienes. Suitable polyether polyols for the preparation of polyether polyurethanes and their dispersions include the polymerization products of cyclic oxides such as ethylene oxide, propylene oxide, tetrahydrofuran, or mixtures thereof. Polyether polyols commonly found include polyoxyethylene (PEO) polyols, plyoxypropylene (PPO) polyols, polyoxytetramethylene (PTMO) polyols, and polyols derived from the mixture of cyclic oxides such as poly(oxyethylene-co-polypropylene) polyols. Typical molecular weight of polyether polyols can range from 250 to 10,000 g/mole. Suitable polyester polyols for the preparation of polyester polyurethanes and their aqueous dispersions include; hydroxy-terminated or containing reaction products of ethylene glycol, propylene glycol, diethylene glycol, neopentyl glycol, 1–4, butanediol, furan dimethanol, polyether diols, or mixtures thereof, with dicarboxylic acids or their ester-forming derivatives.

Modified polyether polyurethanes such as polyetherester polyurethanes and polyethercarbonate polyurethanes may also be suitable polyurethanes for the preparation of aqueous polyurethane dispersions. These modified polyether polyurethanes can be derived by incorporating additional polyester polyols or polycarbonate polyols into polyether polyols during the polyurethane manufacturing.

Typically the polyurethane polymer useful to prepare the polyurethane dispersion as component (B) in the compositions of the present invention is selected from polyether polyurethanes, polyester polyurethanes, polycarbonate polyurethanes, polyetherester polyurethanes, polyethercarbonate polyurethanes, polycaprolactone polyurethanes, hydrocarbon polyurethanes, aliphatic polyurethanes, aromatic polyurethanes, and combinations thereof.

"Polyurethane dispersion" as used herein encompasses both conventional emulsions of polyurethane polymers, for example where a performed polyurethane polymer is emulsified into an aqueous medium with the addition of surfactants and application of shear, and also includes stable mixtures of self-dispersing polyurethane polymers. Polyurethane dispersions of self-dispersing polyurethane polymers are well known in the art and many are commercially available. These polyurethane dispersions are generally free of external surfactants because chemical moieties having surfactant like characteristics have been incorporated into the polyurethane polymer and therefore are "self emulsifying" or "self dispersing". Representative examples of internal emulsifier moieties that can be incorporated into the polyurethane dispersions useful in the present invention include; ionic groups such as sulfontates, carboxylates, and quaternary amines; as well as nonionic emulsifier groups such as polyethers. Such polyurethane dispersions are well known in the art, and are typically prepared by either a one stage or two-stage process. Typically, a isocyanate-terminated polyurethane prepolymer is made from isocyanates, polyols, optional chain extender, and at least one monomer containing a hydrophilic group to render the prepolymer water dispersible. The polyurethane dispersion can then be prepared by dispersing the isocyanate-terminated polyurethane prepolymer in water with other polyisocyanates. Further chain extension can be affected by the addition of chain extenders to the aqueous dispersion. Depending on the choice of the hydrophilic group used to render the polyurethane polymer water dispersible, an additional reaction step may be needed to convert the hydrophilic group to an ionic species, for example converting a carboxyl group to an ionic salt or an amine to an amine salt or cationic quaternary group.

Representative, non-limiting examples of polyurethane dispersions that are suitable for use as component (B) in the compositions of the present invention, as well as general descriptions of techniques useful to prepare polyurethane dispersions can be found in U.S. Pat. Nos. 4,829,122, 4,921,842, 5,025,064, 5,055,516, 5,308,914, 5,334,690, 5,342,915, 5,717,024 5,733,967, 6,017,998, 6,077,611, 6,147,155, and 6,239,213.

Representative, non-limiting examples of commercially available polyurethane dispersions that are suitable for use as component (B) in the compositions of the present invention include: WITCOBOND W 290H, W-290H, W-296, and W213 (Uniroyal Chemical Division, Crompton Corporation, Middlebury, Conn.); DISPERCOLL U42, BAYHYDROL 121, and Bayhydrol 123 polycarbonate polyurethane dispersions (100 Bayer Road, Pittsburgh, Pa. 15025); SANCURE 2710 and 2715 aliphatic polyether polyurethane dispersions (Noveon, Inc. Cleveland, Ohio); NEOREZ R-966, R-967, R-9603 aliphatic polyurethane dispersions (NeoResins Division, Avecia, Wilmington, Mass.).

Optional component (C) is a cure agent. As used herein, a cure agent is any component added to the compositions of the present invention that enhances the curing of the coatings therefrom. One skilled in the art would be able to select an appropriate cure agent given the type of curable groups present on the curable elastomer polymer used in the water continuous emulsion of component (A). Generally, suitable curing agents are water dispersable materials selected from epoxies, silanes, polyaziridines, carbodimide, isocyanates, polyisocyanates, cyanurates, melamines and combinations thereof.

The amount of component (C) used is an amount to effectively cause curing of the coating compositions and will also vary depending on the type of curable groups present on the curable elastomeric polymer.

Representative, but non-limiting examples of typical cure agents useful in the present invention include: WITCOBOND XW from Crompton Corporation (CK Witco Corporation, Middlebury, Conn.); water-reducible melamine resins such as CYMEL 370, CYMEL 373 from CYTEC Industries Inc. (West Paterson, N.J.); polyfunctional aziridines such as IONAC XAMA-7, XAMA-220 from Sybron Chemicals Inc. (Birmingham, N.J.); water-reducible epoxy resins such as EPI-REZ Resin WD-510, and waterborne epoxy resins such as EPI-REZ 3522-W-60, both from Resolution Performance Products (Huston, Tex.; previously Shell Chemical Co.); silanes for aqueous cross-linking of the emulsion coatings include DOW CORNING 777 siliconate and 1–6634 aminopropyl siliconate (Dow Corning Corporation, Midland, Mich.).

Other additives can be optionally incorporated into the curable coating composition of this invention, as component (D), to derive additional specific features. Such additives include, but not limited to; reinforcing or extending fillers such as colloidal silica, fumed silica; colorants and pigments; stabilizers as thermal, UV, and weathering stabilizers; flame retardants, thickeners, biocides, and preservatives.

The curable emulsion coating composition typical of the present invention is a water-continous emulsion emulsion having a non-volatile solids content between 5% to 80% by weight. The non-volatile portion of the coating composition comprises the curable elastomeric polymer of component (A) from 5 to 60 parts, and the polyurethane polymer of component (B) from 40 to 95 parts, and the total solids of components (A) and (B) being 100 parts by weight. Alternatively, the component (A) is present from 10 to 50 parts and the component (B) from 50 to 90 parts; alternatively, the component (A) ranges from 20 to 50, and the component (B) ranges from 50 to 80 parts by weight. The curing agent (C) can be incoporated up to 10 parts, and the reinforcing additive component (D) can be present up to 40 parts, based on a 100 parts total of (A) and (B) components.

The curable coating compositions can be prepared by mixing components (A), (B), and optionally (C) and (D) by any of the techniques known in the art such as milling, blending, and stirring, either in a batch or continuous process. The viscosity of the components and final curable coating composition typically determines the technique and particular device selected. Representative examples of batch reactors that can be used to prepare the curable coating compositions include batch mixers readily available from the following suppliers; Ross, Myers, Turello, Premier, Hockmeyer, and Spangenberg.

The curable coating composition can also be prepared by adding the mixture of components (B), optionally (C), and (D) into component (A) through a dynamic or static mixer to result in a uniform coating composition. This method is particularly desirable in a continuous operation, provided sufficient shear and mixing time can be realized. The continuous mixing operation can occur with inline static mixers (also known as motionless mixers, pipe mixers, tube mixers) and/or a dynamic mixer. Dynamic mixers, also known as inline mixers, rotor-stator mixers, or pipeline mixers, are commonly available through supplies such as Pentax, Ross, Greerco, Ika, Stevenson, et al.

A twin-screw extruder (TSE) can also be used for mixing components (A), (B), and optionally (C) and (D). This procedure is particularly desirable for preparing curable coating compositions with higher % solids content. Typically, component (B) is fed into the dilution zone of the curable elastomer polymer emulsification process and the available water in the PU dispersion is used for diluting the ultra-high solids emulsion composition.

FIG. 1 illustrates a typical method available for the preparation of a curable coating composition on a continuous basis using a silylated poly(isobutylene) (labeled in FIG. 1 as SiPIB) emulsion as component (A), and (B), a polyurethane dispersions (labeled in FIG. 1 as PUD). SiPIB emulsion produced from a twin-screw extruder (TSE) can be fed directly to this process. Various polyurethane dispersions (e.g. PU dispersion 2, and PU dispersion 3) are fed as a premix or separately at various feed points (e.g. points 1 to points 4) before or after static mixer (labeled in FIG. 1 as SM). Additional mixing among the coating components occurs via passage through the dynamic mixer (labeled in FIG. 1 as DM), as powered by a motor (labeled in FIG. 1 as M). Additional additives may be incorporated into the SiPIB-PUD mixture prior to, into, or after the static or dynamic mixer, as noted in the numbered circles 1 to 5 in FIG. 1. The product from the process is collected at point 6, after passing through a filter (labeled in FIG. 1 as F).

The curable coating compositions can be prepared by one of two procedures, depending on the type of polyurethane dispersion, and the relative ratio of curable elastomers in component (A) to the polyurethane polymer in component (B). When preparing a coating composition comprising an acid curable emulsion of an elastomer such as a silylated poly(isobutylene) (abbreviated SiPIB) and polyurethane dispersions of pH 7.0 or higher (i.e. neutral or anionic types of polyurethane dispersion), the pH can be first adjusted to raise the pH of the curable SiPIB emulsion with an alkaline additive such as colloidal silica (or alternatively, a base compound such as 2-amino-2-methyl-1-propanol, AMP) to 6.0 or higher, prior to incorporating the selected polyurethane dispersions. In these types of coating compositions, the pH should be maintained at a value of 6.0 or above, to ensure stability and compatibility. The final pH of the mixture disclosed in this invention varies, depending upon the choice of polyurethane dispersion.

The other method of coating preparation relates to the coating compositions comprising an acidic curable elastomeric emulsion and an acidic polyurethane dispersion. In such cases, the final coating mixtures are acidic and no pH adjustment is needed, as the individual components and finished coating are all acidic and compatible.

The present invention also is directed to a cured coating composition comprising a reaction product of the curable coating composition components (A), (B), and optionally (C) and (D). The curable coating composition can be cured by exposing the composition to air for sufficient time to allow the coating to cure. The cure step can be accelerated by increasing the temperature, for example, from about room temperature to about 180° C., alternatively from room temperature to about 150° C., or alternatively from about room temperature to about 130° C., and allowing the coating to cure for a suitable length of time. For example, the coating composition typically cures in less than about 3 min at 150° C.

The compositions of the present invention have excellent film forming properties and adhere well to a variety of substrates such as fabrics, fibers, yarns, textiles and films. The compositions may be applied to fabric substrates according to known techniques. These techniques include, but not limited to, knife coating, roll coating, dip coating, flow coating, squeeze coating, and spray coating. Knife coating includes knife-over-air, knife-over-roll, knife-over-foam, and knife-over-gap table methods. Roll coating includes single-roll, double-roll, multi-roll, reverse roll, gravure roll, transfer-roll coating methods.

The compositions of the present invention can also be applied to wet fabrics, immediately following a scouring operation. The compositions provide good adhesion to the fabric surface, and dries to a uniform coating without imperfections.

The coatings prepared from the compositions of the present invention have excellent mechanical properties, namely high tensile strength and elongation, which make them useful as airbag and inflatable curtain coatings that require long hold-up time during deployment. The curable coating composition of the instant invention produces coatings that are useful as fabric coatings, and in particular for decreasing air permeability of the coated fabrics at relatively lower coating weights. Thus, the compositions of the present invention are useful for providing coated fabrics suitable for the construction of automotive airbag articles with improved air/gas retention properties.

EXAMPLES

The following examples are presented to further illustrate the compositions and methods of this invention, but are not to be construed as limiting the invention, which is delineated in the appended claims. All parts and percentages in the examples are on a weight basis and all measurements were obtained at about 23° C., unless indicated to the contrary.

The particle size and profile of the formed emulsion coating compositions were evaluated using a MALVERN MASTERSIZER S (Malvern Instruments, Malvern, UK) equipped with 300RF mm range lens to detect particle size in the range 0.05 to 900 $\mu$m. The particle size profile indicates the stability and compatibility of mixture emulsion coatings. The particle size profile of an emulsion coating is reported using these three parameters: D(v, 0.5), D(v, 0.9) and span. D(v, 0.5) is referred as the average particle size and is the size of particle at which 50% of the sample is smaller and 50% is larger than this size. This value is also known as the mass medium diameter. D(v, 0.9) gives a size of particle for which 90% of the sample is below this size. Span is the measurement of the width of the particle size distribution and is the ratio of [D(v, 0.9)–D(v, 0.10)] to D(v, 0.5). No significant changes in the particle size were observed in these emulsion coatings.

Materials

The following materials, listed alphabetically for ease of reference, were employed in the examples.

AMP 95 is a 95% aqueous solution of 2-amino-2-methyl-1-propanol and is useful for raising the pH of the water-continuous emulsion.

Nalco 1050 is a colloidal silica dispersion, used as obtained from Nalco Chemical Company (Chicago, Ill.), containing 50% silica (as SiO2), having a pH of 9.0. (Other alkaline colloidal silica such as Nalco 1030, Nalco 1130, can be used in placed of Nalco 1050 as well.)

Polyacryl BR-300 is an aqueous polyurethane thickener, manufactured by Polacryl Inc. (Stamford, Conn.). It was used to adjust the viscosity of the coating compositions.

PU dispersion 1 is WITCOBOND W-290H which is a 62 wt. % solids anionic polyurethane dispersion of an aliphatic polyester urethane commercially available from Crompton Corporation (Uniroyal Chemical Division, Middlebury, Conn.), and prepared from components containing isophthalic acid, polymer with adipic acid, hexanediol, dimethylolpropanoic acid, and 1,1-methylbis [isocyanatocyclohexane]. The product has a pH value between 7.0 and 9.0, and an average viscosity of 400 cps.

PU dispersion 2 is DISPERCOLL U42, an aqueous polyurethane dispersion produced by Bayer Corporation (100 Bayer Road, Pittsburgh, Pa. 15025). This polyurethane dispersion comprises a linear polyester urethane based on hexamethylene diisocyanate (HDI) and is an anionic polyurethane dispersion at 50 wt. % solids in water having a pH of 7 and a viscosity of 500 centipoises.

PU dispersion 3 is SANCURE 2715, an aqueous dispersion of an aliphatic polyether polyurethane polymer, used as provided from Noveon, Inc. (Cleveland, Ohio; formally B F Goodrich). This polyurethane dispersion is an anionic dispersion, having 38 wt. % solids, a pH of 9.0, and a viscosity of 750 cps.

PU dispersion 4 is WITCOBOND W-213, a cationic polyurethane dispersion used as supplied from Crompton Corporation (Uniroyal Chemical Division, Middlebury, Conn.).

SiPIB emulsion 1 is a curable emulsion of a 75.0 wt. % solids non-ionic emulsion of dimethoxysilyl-functional poly(isobutylene-co-paramethylstyrene) (SiPIB) copolymer (curable elastomeric polymer) containing isostearic acid as a curable additive, prepared utilizing a lab-scale mixer according to the method taught in the U.S. patent application Ser. No. 09/905,660. This silane-grafted PIB copolymer had a zero-shear viscosity of 1.5 MM poise (150 kPa·s). The resulting emulsion had a pH of 4.0 to 4.5, and an average particle size of 0.532 $\mu$m. This SiPIB emulsion had excellent shelf stability as exhibited by its stable particle size distribution with time.

SiPIB emulsion 2 is a non-ionic curable emulsion of a dimethoxysilyl-functional poly(isobutylene-co-paramethylstyrene) (SiPIB) copolymer (curable elastomeric polymer) containing isostearic acid as a curable additive, made on a twin-screw extruder having a wt. % solids of 78.8 in water according to the method disclosed in U.S. patent application Ser. No. 09/905,660.

SiPIB emulsion 3 is an emulsion of EPION 500S silane-terminated polyisobutylene homopolymer prepared according to the method of U.S. patent application Ser. No. 09/905,660. EPION 500S is a dimethoxysilyl-terminated polyisobutylene with a number-average molecular weight of 17,000 g/mole, obtained commercially from Kaneka Corporation. This emulsion had a D(v, 0.5) average particle size of 0.32 um, a pH value of 3.3, and a % solids of 76.0 by weight.

SiPIB emulsion 4 is similar to SiPIB emulsion 2, but made with 10 parts isostearic acid per 100 parts SiPIB polymer, and having a wt. % solids of 81.1.

SiPIB emulsion 5 is similar to SiPIB emulsion 2, but made with 5 parts isostearic acid per 100 parts SiPIB polymer, and having a wt. % solids of 81.1.

SiPIB emulsion 6 is similar to SiPIB emulsion 2, but has a wt. % solids of 83.3.

SiPIB emulsion 7 is similar to SiPIB emulsion 2, but has a wt. % solids of 80.1.

Witcobond XW is a 55 wt. % solids aqueous epoxy dispersion having an epoxide equivalent weight of 365 gm and a viscosity of 840 centipoise, and was used as obtained from Crompton Corporation (Uniroyal Chemical Division, Middlebury, Conn.).

Example 1
Curable SiPIB Emulsion Coating

Cured coatings of SiPIB emulsion #1 were prepared by forming a thin film of the emulsion, allowing the film to air dry to form a free-standing film having a thickness of 0.010 to 0.020 inches, and then curing the film for 2 hours at 125° C. The mechanical properties of the cured coating were tested utilizing an MTS Alliance tensile tester (MTS Systems Corporation, Eden Prairie, Minn.), following the ASTM method D412 at a crosshead speed of 12 inch/min (30.48 cm/min). The cured coating derived from this SiPIB emulsion was a very soft, compliant elastomeric film, having a tensile strength of 59 psi (407 kPa), an elongation of 595% and a modulus of 11 psi (77 kPa).

Examples 2–5
SiPIB/PU Emulsion Coatings

These examples illustrate stable curable emulsions comprising a curable elastomeric polymer emulsion and polyurethane dispersion, and the method of preparing compatible emulsion coating compositions containing them. The emulsions of these examples were curable to form a uniform coating of elastomeric silane-grafted polyisobutylene copolymer and polyurethane with a desirable mechanical property ranging from soft elastomeric to tough elastomeric coating strength.

Curable SiPIB/PU elastomeric emulsions were prepared by first incorporating a small amount of AMP95 aqueous solution into SiPIB emulsion 1 to raise the pH of the emulsion to above 6.0 for stability. De-ionized water was added to lower the viscosity for ease of mixing, but is not a necessary step to prepare the compositions of the present invention. PU dispersion 1 was then added to the SiPIB emulsion and mixed to form a homogeneous mixture. Coating films of the SiPIB/PU mixtures were then prepared, see Table 1 for a summary of the formulations used, and evaluated by the procedures described in Example 1. For comparison, coating films of the polyurethane dispersion (PU dispersion 1) were prepared and tested according to the formulation described as Example 5 in Table 1.

The mechanical properties of the cured coatings of these SiPIB/PU emulsion compositions were excellent compared to that of the starting materials: much better tensile strength compared to SiPIB shown in Example 1, and a synergistically better % elongation than those of SiPIB emulsion in Example 1 and PU dispersion in Example 5. Thus, the tensile strength of the SiPIB/PU emulsion coatings can be adjusted/controlled via the amounts of SiPIB emulsion and PU dispersion, as expressed in SiPIB to PU ratio, based on the total solids being 100 parts.

TABLE 1

|  | Example | | | | |
| --- | --- | --- | --- | --- | --- |
| SiPIB/PU ratio | 1<br>100/0 | 2<br>50/50 | 3<br>30/70 | 4<br>20/80 | 5<br>0/100 |
| SiPIB emulsion 1 | 40 g | 40 g | 17.7 g | 10.3 g | |
| PU Dispersion 1 | | 48 g | 50 g | 50 g | 50 g |
| D.I. Water | 10 g | 10 g | 3.6 g | 2.2 g | |
| AMP 95 | 0.5 g | 0.5 g | 0.2 g | 0.1 g | |
| Emulsion particle size | | | | | |
| D(v, 0.5), micrometer | 0.532 | 0.492 | 0.485 | 0.406 | 0.45 |
| D(v, 0.9), micrometer | 1.62 | 1.52 | 1.49 | 1.35 | 1.52 |
| Span | 2.79 | 2.83 | 2.81 | 3.05 | 3.11 |
| Cured coating property | | | | | |
| Tensile strength, psi (kPa) | 94 (648) | 648 (4465) | 1259 (8674) | 1576 (10858) | 3572 (24611) |
| % Elongation | 595 | 748 | 551 | 513 | 534 |
| Modulus at 100%, psi (KPa) | 11 (76) | 83 (572) | 164 (1130) | 232 (1599) | 381 (2625) |

Examples 6–11
Curable SiPIB/PU Emulsion Coatings with High Elasticity

A series of curable SiPIB/PU emulsion compositions were prepared using SiPIB emulsion 2 and PU dispersion 2 as the main components, as summarized in Table 2. In this series, NALCO 1050 was used to adjust the pH of the SiPIB emulsion 2 to above 6.0. WITCOBOND XW aqueous emulsion of epoxy resin was also incorporated in these formulations as an optional curing agent to impart additional cross-linking to the SiPIB/PU coatings. The SiPIB/PU emulsion coatings were prepared by incorporating Nalco 1050 colloidal silica into the curable SiPIB emulsion to raise the pH to above 6, then adding the prescribed amount of DISPERCOLL U42 polyurethane dispersion into the mixture, and finishing with the addition of WITCOBOND XW epoxy dispersion cross-linker. The resulting SiPIB/PU compositions were stable emulsions having sub-micron average particle size, as summarized in Table 2.

The formulation and mechanical properties of the resulting coatings for the SiPIB emulsion alone are summarized as Example 6 in Table 2. The formulation and mechanical properties for the polyurethane dispersion alone are summarized as Example 11 in Table 2.

The data summarized in Table 2 for Examples 7–10 shows a synergistic effect for this series of SiPIB/PU coating. The % elongation of the SiPIB/PU emulsion coatings was surprisingly better than the starting SiPIB emulsion 2 or PU dispersion 2 alone. This effect varied with the amount of SiPIB emulsion 2 to PU dispersion 2, as expressed in terms of SiPIB to PU ratio based on the coating solids. The tensile strength and the modulus of the cured SiPIB/PU coatings corresponded to the SiPIB/PU ratio, indicating compatibility in the cured coating structure.

Examples 12–16

Curable SiPIB/PU Emulsion Compositions with High Coating Strength

Illustrated in this series of examples are emulsion compositions that were prepared from an emulsion of curable SiPIB polymer (SiPIB emulsion 2) and a polyurethane dispersion (PU dispersion 3) that cure to give coatings with high tensile strength.

The emulsion compositions, as summarized in Table 3, were prepared following the same procedure described above. The produced SiPIB/PU curable emulsion compositions exhibited excellent sub-micron average particle size and good stability, as shown in Table 3. The physical properties of the cured coatings, summarized in Table 3, demonstrate typical profiles of tough elastomeric coatings, i.e. high tensile, good elongation, and reasonable modulus properties. Tensile strengths corresponded to the SiPIB to PU ratio, shown in weight ratio based on 100 total solids parts. The modulus at 100% elongation, usually an indication of the rigidity of coatings, also corresponded well to the SiPIB/PU compositional ratio. The % elongation remains consistently high throughout the SiPIB/PU ratio shown.

TABLE 2

| | Example | | | | | |
|---|---|---|---|---|---|---|
| SiPIB/PU ratio | 6<br>100/0 | 7<br>60/40 | 8<br>50/50 | 9<br>40/60 | 10<br>30/70 | 11<br>0/100 |
| SiPIB emulsion 2 | 40.0 g | 40.0 g | 25.4 g | 20.0 g | 13.59 g | |
| PU Dispersion 2 | | 42 g | 40.0 g | 47.27 g | 50.0 g | 60.0 g |
| Witcobone XW | | 1.91 g | 1.45 g | 1.43 g | 1.30 g | 1.10 g |
| Nalco 1050 | 3.15 g | 5.25 g | 4.0 g | 3.94 g | 3.57 g | 3.0 g |
| D.I. Water | 4.13 g | | 0.5 g | | | |
| Wt. % solids | 70.0 | 63.0 | 60.0 | 58.0 | 55.8 | 51.0 |
| Particle size profile | | | | | | |
| D(v, 0.5), micrometer | 0.737 | 0.505 | | 0.424 | 0.414 | |
| D(v, 0.9), micrometer | 1.98 | 1.49 | | 1.23 | 1.14 | |
| Span | 2.39 | 2.68 | | 2.6 | 2.46 | |
| Property of cured coating | | | | | | |
| Tensile, psi (kPa) | 89 (613) | 111 (765) | 187 (1288) | 301 (2074) | 405 (2790) | 700 (4823) |
| % elongation | 459 | 1540 | 1530 | 1411 | 1327 | 1160 |
| Modulus at 100%, psi (kPa) | 30 (207) | 41 (282) | 52 (358) | 53 (365) | 77 (530) | 152 (1047) |

TABLE 3

| | Example | | | | |
|---|---|---|---|---|---|
| SiPIB/PU ratio | 12<br>60/40 | 13<br>50/50 | 14<br>40/60 | 15<br>30/70 | 16<br>0/100 |
| SiPIB emulsion 2 | 30.0 g | 25.4 g | 20.0 g | 13.59 g | |
| PU Dispersion 3 | 41.5 g | 52.6 g | 62.2 g | 65.8 g | 78.9 g |
| Witcobone XW | 0.83 g | 1.45 g | 1.43 g | 1.30 g | 1.10 g |
| Nalco 1050 | 3.94 g | 4.0 g | 3.94 g | 3.57 g | 3.0 g |
| pH @ 25° C. | 7.39 | 7.53 | 7.83 | 7.99 | 8.5 |
| Particle size profile | | | | | |
| D(v, 0.5), $\mu$m | 0.68 | 0.591 | 0.657 | 0.694 | 0.61 |
| D(v, 0.9), $\mu$m | 1.88 | 1.74 | 1.91 | 2.05 | 0.36 |
| Span | 2.5 | 2.68 | 2.64 | 2.7 | 4.99 |

TABLE 3-continued

|  | Example | | | | |
|---|---|---|---|---|---|
|  | 12 | 13 | 14 | 15 | 16 |
| SiPIB/PU ratio | 60/40 | 50/50 | 40/60 | 30/70 | 0/100 |
| Property of cured coating | | | | | |
| Tensile strength, psi (kPa) | 920 (6339) | 1570 (10817) | 1962 (13518) | 2690 (18534) | 5475 (37722) |
| % Elongation | 543 | 486 | 504 | 440 | 534 |
| Modulus at 100%, psi (kPa) | 168 (1157) | 302 (2081) | 456 (3142) | 759 (5229) | 1571 (10824) |

Examples 17–19

Curable Cationic SiPIB/PU Emulsion Compositions

Curable emulsion compositions of emulsions of curable SiPIB polymer and cationic polyurethane dispersions were prepared. These emulsion compositions, as summarized in Table 4, were prepared following the same procedure described above. Compositions were prepared comprising SiPIB emulsion 2 and PU dispersion 4. The cationic polyurethane dispersions can be incorporated directly into the SiPIB emulsion, without adjusting the pH of the SiPIB emulsion, due to the cationic charge nature of this polyurethane dispersion. The properties of the resulting SiPIB/PU emulsion coating and resulting coatings thereof are summarized in Table 4.

TABLE 4

|  | Example | | |
|---|---|---|---|
|  | 17 | 18 | 19 |
| SiPIB/PU ratio | 50/50 | 40/60 | 30/70 |
| SiPIB emulsion 2 | 25.4 g | 20.0 g | 13.59 g |
| PU Dispersion 4 | 66.6 g | 78.8 g | 83.4 g |
| Witcobond XW | 1.45 g | 1.43 g | 1.30 g |
| pH @ 25° C. | 5.09 | 5.28 | 5.44 |

TABLE 4-continued

|  | Example | | |
|---|---|---|---|
|  | 17 | 18 | 19 |
| SiPIB/PU ratio | 50/50 | 40/60 | 30/70 |
| Particle size profile | | | |
| D(v, 0.5), um | 0.732 | 0.722 | 0.736 |
| D(v, 0.9), um | 2.54 | 2.63 | 3.21 |
| Span | 3.21 | 3.39 | 4.11 |
| Property of cured coating | | | |
| Tensile strength, psi (kPa) | 977 (6731) | 1138 (7841) | 2435 (16777) |
| % Elongation | 432 | 379 | 466 |
| Modulus at 100%, psi (kPa) | 283 (1950) | 404 (2783) | 659 (4540) |

Examples 20–24

Curable SiPIB/PU Emulsion Coatings

Curable SiPIB/PU emulsion coatings were prepared by incorporating the SiPIB emulsion 3 into either PU dispersion 2 or 3, following the procedure described in the previous examples. The formulations, resulting emulsion and coating properties are summarized in Table 5. These emulsion coatings again exhibited excellent stability and compatibility. The resulting properties of the cured coatings were typical of elastomeric protective coatings.

TABLE 5

|  | Example | | | | |
|---|---|---|---|---|---|
|  | 20 | 21 | 22 | 23 | 24 |
| SiPIB/PU ratio | 100/0 | 50/50 | 40/60 | 30/70 | 50/50 |
| SiPIB emulsion 3 | 40.0 g | 25.4 g | 20.0 g | 13.59 g | 25.4 g |
| PU Dispersion 4 |  | 52.6 g | 62.2 g | 65.8 g |  |
| PU Dispersion 2 |  |  |  |  | 40.0 g |
| Witcobond XW |  | 1.45 g | 1.43 g | 1.30 g | 1.45 g |
| Nalco 1050 | 3.15 g | 4.0 g | 3.94 g | 3.57 g | 4.0 g |
| Wt. % solids | 70.0 |  |  |  | 60.0 |
| pH @ 25° C. | 4.28 | 7.528 | 7.614 | 7.72 | 5.445 |
| Particle size profile | | | | | |
| D(v, 0.5), μm | 0.319 | 0.322 |  | 0.341 | 0.345 |
| D(v, 0.9), μm | 0.86 | 0.93 |  | 0.89 | 0.91 |
| Span | 2.37 | 2.57 |  | 2.28 | 2.3 |
| Property of cured coatings | | | | | |
| Tensile, psi (kPa) | 292 (2012) | 1725 (11885) | 2220 (15296) | 2586 (17817) | 211 (1454) |
| % elongation | 760 | 607 | 535 | 620 | 1200 |
| Modulus at 100% psi (kPa) | 32 (220) | 289 (1991) | 442 (3045) | 526 (3624) | 38 (262) |

Examples 25–28
Curable SiPIB/PU Emulsion Coating Derived from Mixed PU Dispersions These examples illustrate that curable emulsion compositions can be prepared which produce coatings having improved thermal and humidity aging resistance stability. This was accomplished by preparing specific SiPIB/PU compositions comprising a curable elasomtomer emulsion (SiPIB emulsion 2) and adding two polyurethane dispersions (PU dispersion 2 and 3) at various amounts and ratios, according to the procedures described above. The formulations, resulting emulsion and coating properties are summarized in Table 6. The data in Table 6 shows the "as prepared" properties of the cured films from these emulsion compositions, as well as the properties after 4 days at 107° C. thermal aging, and 6 days humidity aging at 80 C. and 90% humidity.

TABLE 6

| | Example | | | |
|---|---|---|---|---|
| SiPIB/PU ratio | 25<br>50/50 | 26<br>50/37.5/12.5 | 27<br>50/25/25 | 28<br>50/12.5/37.5 |
| SiPIB emulsion 2 | 25.4 g | 25.4 g | 25.4 g | 25.4 g |
| PU Dispersion 3 | 52.6 g | 39.5 g | 26.3 g | 13.2 g |
| PU Dispersion 2 | | 10.0 g | 20.0 g | 30.0 g |
| Nalco 1050 | 4.0 g | 4.0 g | 4.0 g | 4.0 g |
| Witcobone XW | 1.45 g | 1.45 g | 1.45 g | 1.45 g |
| Polacryl BR-300 | 0.40 g | 0.40 g | 0.40 g | 0.40 g |
| Wt. % solids | 51.1 | 53.1 | 55.3 | 57.8 |
| Cured coating property, initial | | | | |
| Tensile, psi (kPa) | 1578 (10872) | 1336 (9205) | 1031 (7103) | 582 (4009) |
| % Elongation | 470 | 547 | 650 | 666 |
| Modulus at 100%, psi (kPa) | 339 (2336) | 212 (1460) | 137 (944) | 86 (592) |
| 125° C. aged, for 4 days | | | | |
| Tensile, psi (kPa) | 1684 (11602) | 1369 (9432) | 977 (6731) | 737 (5078) |
| % Elongation | 414 | 436 | 557 | 738 |
| Modulus at 100%, psi (kPa) | 416 (2866) | 307 (2115) | 183 (1261) | 94 (648) |
| Humidity aged @ 80° C./90% RH | | | | |
| Tensile, psi (kPa) | 1327 (9143) | 1390 (9577) | 989 (6814) | 758 (5222) |
| % Elongation | 466 | 468 | 572 | 619 |
| Modulus at 100%, psi (kPa) | 246 (1695) | 300 (2067) | 174 (1199) | 118 (813) |

Examples 29–30
Preparation of SiPIB/PU Emulsion Coating by Batch Mixer with High-speed Disperser Two SiPIB/PU emulsion coating compositions were prepared in a 10 gallon (0.038 m³) Ross mixer equipped with a high-speed disperser. PU dispersion 3, PU dispersion 2 and Nalco 1050 were charged to the clean batch mixer and agitated to form uniform mixture. SiPIB emulsion 4 or SiPIB emulsion 5 was added to the mixer followed by vigorous mixing from operating the disperser at high speed (1500 to 3000 rpm) with a two-wing anchor agitator at high speed (200 to 500 rpm). The mixing continued for at least 1.5 hours to ensure the SiPIB emulsion was mixed homogeneously. DC1400 antifoam was added, as needed, to minimize the foam formation during the high speed mixing. Optional components Witcobond XW, Polyacryl BR 300 thickener and Tektamer 38 AD biocide were added with thorough mixing. The resulting coating composition was further filtered to remove any particulate matter. The coating composition properties and cured coating thereof are shown in Table 7.

TABLE 7

| | Example | |
|---|---|---|
| | 29 | 30 |
| SiPIB emulsion 4, Kg | 11.0 | |
| SiPIB emulsion 5, Kg | 0.0 | 10.6 |
| Nalco 1050 (51.7% solids), Kg | 1.8 | 1.7 |
| PU Dispersion 3 | 19.7 | 19.7 |
| PU Dispersion 2 | 4.5 | 4.6 |
| Witcobond XW (55.0% solids), Kg | 0.7 | 0.7 |
| Polyacryl BR-300 (30% solids), Kg | 0.1 | 0.1 |
| Tektamer 38 AD biocide, Kg | 0.046 | 0.046 |
| DC 1400 antifoam, Kg | 0.016 | 0.017 |
| Total batch, Kg | 37.84 | 37.45 |
| Wt. % solids | 53.2 | 52 |
| pH of the coating | 7.41 | 7.59 |

TABLE 7-continued

| | Example | |
|---|---|---|
| | 29 | 30 |
| Particle size profile | | |
| D(v, 0.5), μm | 0.444 | 0.392 |
| D(v, 0.,9), μm | 1.7 | 1.39 |
| Span | 3.57 | 3.27 |
| D[4,3], μm | 1.16 | 0.63 |
| Mechanical property of cured coating | | |
| Tensile, psi (kPa) | 1518 (10459) | 1331 (9170) |
| % Elongation | 580 | 759 |
| Modulus @ 100%, psi (kPa) | 272 (1874) | 191 (1316) |

Examples 31–32
Preparation of SiPIB/PU Coating Compositions Using a Low-shear Ross Mixer Two different SiPIB/PU coating compositions were prepared using a low-shear Ross mixer equipped with a set of high viscosity blades that rotated on a double planetary mixing (DPM) action. The formulations are summarized in Table 8.

A one-quart (0.95 L) Ross mixer equipped with a set of double-planetary high viscosity blades (HVB) was charged with 694 g of a PU premix consisting of PU Dispersion 3 (522.9 g), and PU dispersion 2 (123.7 g), and Nalco 1050 (47.42 g). Then, 283 g of SiPIB curable emulsion 6 (at 83.3% solids) was added in four installments to the mixer while the high viscosity blades rotated at 40–80 rpm. A second coating composition (Example 32) was made to include Witcobond XW following similar procedure. The property of the produced coatings and the cured coatings are shown in the Table 8

TABLE 8

|  | Patent Example | |
|---|---|---|
|  | 31 | 32 |
| Si-PIB emulsion 6, gm | 282.9 | 282.9 |
| PUD Premix, gm (40.5% solids), gm | 694 | 694 |
| Sancure 2715 PU (38% solids), gm | 522.9 | 522.9 |
| Dispercoll U42 PU (50% solids), gm | 123.68 | 123.68 |
| Nalco 1050 (50% solids), gm | 47.42 | 47.42 |
| Witcobond XW (55% solids) |  | 18.17 |
| pH of coating | 7.804 | 8.13 |
| Initial, tensile, psi (kPa) | 1256 (8653) | 1496 (10307) |
| % Elongation | 731 | 608 |
| Modulus @ 100%, psi (kPa) | 190 (1309) | 229 (1578) |
| After 400 hrs 107 C. tensile, psi (kPa) | 1193 (8220) | 1377 (9487) |
| % Elongation | 606 | 418 |
| Modulus @ 100%, psi (kPa) | 265 (1826) | 354 (2439) |

Example 33

SiPIB/PU Coating Composition by Inline Dynamic Mixer (Pentax Mixer)

To prepare a SiPIB/PU coating, PU dispersion 3 (146.8 kg), and PU dispersion 2 (34.7 kg) and Nalco 1050 (13.3 kg) were mixed using an air motor to form a mixture (referred to as PU Premix). The curable SiPIB/PU elastomeric emulsions were prepared by feeding the PU Premix and SiPIB emulsion separately into a static mixer in series with a Pentax mixer. Witcobond XW was added in the premix zone of the Pentax mixer. Other optional ingredients including biocide, such as Kathon LX 1.5, and thickener, such as BR300, were added into the first primary mix zone of the Pentax mixer. All the coating components were effectively mixed to yield a uniform coating composition at an output rate of about 1012 g/min. The speed of the Pentax mixer was 80 Hz. The formulation and physical properties are summarized in Table 9.

TABLE 9

| Patent Example | 33 |
|---|---|
| SiPIB/PU ratio |  |
| SiPIB emulsion (g/min) | 323 |
| PU Premix (g/min) | 666 |
| Witcobond XW (g/min) | 19.6 |
| Kathon LX 1.5 (g/min) | 0.85 |
| BR300 (g/min) | 3 |
| Total output, g/min | 1012.45 |
| Speed (Hz) | 80.1 |
| Particle Size Distribution |  |
| D(v, 0.5), μm | 0.344 |
| D(v, 0.9), μm | 0.97 |

TABLE 9-continued

| Patent Example | 33 |
|---|---|
| Span | 2.52 |
| D[4,3], μm | 0.47 |

Example 34

Preparation of SiPIB/PU Coating Composition by Inline Static Mixer Plus Ross Dynamic Mixer To prepare this SiPIB/PU coating composition, a PU Premix consisting of PU dispersion 3 (146.8 kg), PU Dispersion 2 (34.7 kg) and Nalco 1050 (13.3 kg) were mixed using an air motor. The curable SiPIB/PU elastomeric emulsions were prepared by feeding the PU Premix and SiPIB emulsion 7 separately into a static mixer in series with a Ross mixer. The optional curing agent Witcobond XW was fed at the point prior to the dynamic mixer to effectively yield a coating composition. The formulation and physical property data for this example is summarized in Table 10.

TABLE 10

| Example # | 34 |
|---|---|
| SiPIB emulsion (g/min) | 222 |
| PU Premix (g/min) | 445 |
| Witcobond XW (g/min) | 13.1 |
| Total output, g/min | 680.1 |
| Speed (Hz) | 80.1 |
| Particle Size Distribution |  |
| D(v, 0.5), μm | 0.323 |
| D(v, 0.9), μm | 0.78 |
| Span | 2.07 |
| D[4,3], μm | 0.41 |

Example 35

Preparation of Coating Emulsion Using a Twin Screw Extruder (TSE) for Mixing/Dispersion A SiPIB/PU elastomeric coating composition was prepared using a 25 mm Krupp Werner & Pfleiderer co-rotating twinscrew extruder, according to the conditions summarized in Table 11. First a premix consisting of 115.9 kg of PU dispersion 3 and 27.3 kg of PU dispersion 2 and Nalco 1050 (10.7 kg) was prepared, a portion of which was added at the end of the extrusion process. The remaining portion of the PU premix was added prior to a static mixer in series with a Pentax mixer, according to the conditions in Table 11. Witcobond XW curing agent was added in the premix zone of the Pentax mixer. Table 11 also shows the feeding points onto TSE of the various components incorporated. The resulting mixture was a uniform coating with sub-micron particle size profile, as the results in Table 11 summarize.

TABLE 11

|  | Addition point on TSE | Addition rate |
|---|---|---|
| Si-P(IB-co-pMS) polymer, g/min |  | 225 |
| Isostearic acid, g/min | 6 L/D | 10.2 |
| Acetic acid, g/min | 6 L/D | 0.63 |
| Brij 35L (72%), g/min | 6 L/D | 17.5 |
| Brij 97, g/min | 6 L/D | 8.4 |
| Water 1, g/min | 6 L/D | 19.3 |

TABLE 11-continued

| | Addition point on TSE | Addition rate |
|---|---|---|
| PU Premix, g/min | 38 L/D | 137.9 |
| PU Premix | After TSE prior to static mixer | 568 |
| Witcobond XW | Premix zone | 19.3 |
| Total amount, g/min | | 1044 |
| Screw speed, rpm | | 500 |
| Particle size profile | | |
| D(v, 0.5), μm | | 0.341 |
| D(v, 0.9), μm | | 0.92 |
| Span | | 2.37 |
| D[4,3] μm | | 0.50 |

Whath is claimed is:

1. A curable coating composition comprising:
   (A) a water continuous emulsion comprising a silylated copolymer having a viscosity of 0.5–1,000,000 KPa-s at 23° C. and a glass transition temperature up to 50° C.;
   (B) an aqueous polyurethane dispersion; and optionally,
   (C) a cure agent.
   wherein the silylated copolymer is a reaction product of:
   a) an olefin copolymer comprising at least 50 mole % of at least one $C_4$ to $C_7$ isomonoolefin and at least one vinyl aromatic monomer;
   b) a silane of the general formula $RR'SiY_2$ wherein R represents a monovalent olefinically unsaturated hydrocarbon or hydrocarbonoxy radical, each Y represents a hydrolyzable organic radical and R' represents an alkyl radical, an alkyl radical or a Y radical; and
   c) a free radical generating agent.

2. The curable coating composition of claim 1 wherein the silylated copolymer comprises at least 60 mole % of at least one $C_4$ to $C_7$ isomonoolefin.

3. The curable coating composition of claim 1 wherein the silylated copolymer comprises at least 80mole % of isobutylene and from 0.1 up 20 mole % of para-alkylstyrene.

4. The curable coating composition of claim 1 wherein the aqueous polyurethane dispersion comprises a polyurethane selected from polyether polyurethanes, polyester polyurethanes, polycarbonate polyurethanes, polyetherester polyurethanes, polyethercarbonate polyurethanes, polycaprolactone polyurethanes, hydrocarbon polyurethanes, aliphatic polyurethanes, aromatic polyurethanes, and combinations thereof.

5. The curable coating composition of claim 4 wherein the polyurethane dispersion comprises a polyether polyurethane.

6. The curable coating composition of claim 1 wherein the cure agent is added and is a water dispersible material selected from epoxies, silanes, polyaziridines, carbodimide, isocyanates, polyisocyanates, cyanurates, melamines and combinations thereof.

7. The curable coating composition of claim 1 further comprising:
   (D) an additive selected from filters, colloidal silica, fumed silica, colorants, pigments, UV stabilizers, thermal stabilizers, weathering stabilizers, flame retardants, thickeners, biocides, and preservatives.

8. A cured coating composition comprising a reaction product of the composition of claim 1.

9. A cured coating composition comprising a reaction product of the composition of claim 2.

10. A cured coating composition comprising a reaction product of the composition of claim 3.

11. A cured coating composition comprising a reaction product of the composition of claim 4.

12. A cured coating composition comprising a reaction product of the composition of claim 5.

13. A cured coating composition comprising a reaction product of the composition of claim 6.

14. A cured coating composition comprising a reaction product of the composition of claim 7.

15. An article of manufacture comprising the cured coating composition of claim 8.

16. A method for making a curable coating composition comprising mixing;
   (A) a water continuous emulsion comprising a silylated copolymer having a viscosity of 0.5–1,000,000 KPa-s at 23° C. a glass transition temperature up to 50° C.;
   (B) an aqueous polyurethane dispersion; and optionally,
   (C) a cure agent,
   wherein the silylated copolymer is a reaction product of:
   a) an olefin copolymer comprising at least 50 mole % of at least one $C_4$ to $C_7$ isomonoolefin and at least one vinyl aromatic monomer;
   b) a silane of the general formula $RR'SiY_2$ wherein R represents a monovalent olefinically unsaturated hydrocarbon or hydrocarbonoxy radical, each Y represents a hydrolyzable organic radical and R' represents an alkyl radical, an aryl radical or a Y radical; and
   c) a free radical generating agent.

17. The method of claim 16 wherein mixing is performed by a batch process.

18. The method of claim 16 wherein mixing is performed by a continuous process.

19. The method of claim 18 wherein the continuous process is an extrusion process.

20. The method of claim 18 wherein the extrusion process is performed by a twin screw extruder.

21. A method for making a curable coating composition comprising;
   I) mixing
      (A) a water continuous emulsion comprising a silylated copolymer having a viscosity of 0.5–1,000,000 KPa-s and a glass transition temperature up to 50° C.;
      with an alkaline additive to form a pH adjusted water continuous emulsion having a pH of at least 6.0;
   II) further mixing the pH adjusted water continuous emulsion, with
      (B) an aqueous polyurethane dispersion; and optionally,
      (C) a cure agent,
   wherein the silylated copolymer is a product of:
   a) an olefin copolymer comprising at least 50 mole % of at least one $C_4$ to $C_7$ isomonoolefin and at least one vinyl aromatic monomer;
   b) a silane of the general formula $RR'SiY_2$ wherein R represents a monovalent olefinically unsaturated hydrocarbon or hydrocarbonoxy radical, each Y represents a hydrolyzable organic radical and R' represents an alkyl radical, an aryl radical or a Y radical; and
   c) a free radical generating agent.

22. The method of claim 21 wherein the alkaline additive is colloidal silica.

23. The method of claim 21 wherein the alkaline additive is a base compound.

24. The method of claim 23 wherein the base compound is 2-amino-2-methyl-1-propanol.

25. The product produced by the method of claim 16.
26. The product produced by the method of claim 17.
27. The product produced by the method of claim 18.
28. The product produced by the method of claim 19.
29. The product produced by the method of claim 20.
30. The product produced by the method of claim 21.
31. The product produced by the method of claim 22.
32. The product produced by the method of claim 23.
33. The product produced by the method of claim 24.

* * * * *